United States Patent [19]

Levine

[11] Patent Number: 4,821,417

[45] Date of Patent: Apr. 18, 1989

[54] DEVICE FOR FACILITATING USE BY HANDICAPPED OF TOOLS AND UTENSILS

[76] Inventor: Anthony H. Levine, 5000 Brewster Dr., Tarzana, Calif. 91356

[21] Appl. No.: 40,907

[22] Filed: Apr. 9, 1987

[51] Int. Cl.$^4$ .............................................. A47J 43/28
[52] U.S. Cl. ...................................... 30/298; 30/142; 30/322; 30/324; 623/65
[58] Field of Search ................. 30/142, 298, 323, 324, 30/327, 340, 322; 224/219, 222; 401/6, 7, 8; 623/65, 66; 15/443, 437; 446/72, 73, 227, 368, 374, 419; 273/24, 67 B, 81 R; 7/167, 168; 81/489, 491

[56] References Cited

U.S. PATENT DOCUMENTS

| | | | |
|---|---|---|---|
| D.38,680 | 7/1907 | Brereton | 30/324 X |
| 565,374 | 8/1896 | Yarbrough | 15/443 X |
| 1,176,930 | 3/1916 | Smith | 30/298 |
| 2,083,172 | 7/1935 | Smith. . | |
| 2,474,100 | 3/1948 | Earnest, Jr. . | |
| 2,812,577 | 11/1957 | Leibow. . | |
| 3,224,093 | 6/1965 | Huck. . | |
| 3,942,194 | 3/1976 | Winter | 623/65 |
| 4,325,187 | 4/1982 | Wasson | 30/298 X |
| 4,389,777 | 6/1983 | Laudsberger. . | |
| 4,666,417 | 5/1987 | Hillman | 446/374 X |

FOREIGN PATENT DOCUMENTS

| | | | |
|---|---|---|---|
| 3540257 | 11/1986 | Fed. Rep. of Germany | 30/142 |
| 183827 | 10/1923 | United Kingdom | 30/340 |

OTHER PUBLICATIONS

"Designscapes" Magazine of International Design, Sep-Oct, 1985, p. 63
SELF HELP AIDS, Preston Corporation, #2 and #3 (p. 93)

Primary Examiner—Frank T. Yost
Assistant Examiner—Michael D. Folkerts
Attorney, Agent, or Firm—Browdy and Neimark

[57] ABSTRACT

A device for use by the manually disabled for carrying an eating utensil or the like includes an easily bendable "handle" for wrapping about the limb of a handicapped person, one end of which is terminated by any of an assortment of removable tools and utensils. Once bent, the handle remains in its deformed position.

9 Claims, 2 Drawing Sheets

DEVICE FOR FACILITATING USE BY HANDICAPPED OF TOOLS AND UTENSILS

FIELD OF INVENTION

The present invention relates to a device for facilitating use by handicapped of tools and utensils. More particularly, it relates to a tool or utensil holder in the nature of an easily bendable handle for wrapping about the limb of a handicapped person, one end of which is terminated by a coupling means for retaining at such end a suitable tool or utensil.

BACKGROUND OF THE INVENTION

The disabling or loss of part of a hand frequently makes it very difficult for the handicapped person to use ordinary household utensils such as knives, forks, and spoons, or other simple tools. This disability is not at all uncommon, and may be caused by something as ordinary as arthritis, or something more unusual such as cerebral palsy or the loss of one or more fingers.

Devices have been contemplated to overcome or to at least mitigate the aforementioned problems. For instance, a hollow rubber tube can be fitted over the existing handle of a utensil in order to make the handle larger in diameter and therefore easier to grasp for those unable to close their hands tightly. However, beyond this simple expediency, the majority of devices have been custom-tailored for the generic disability or for the individual person. While such prosthetic devices may work very well, they have the disadvantage of being very expensive and not suitable for a user whose disability is changing, e.g. a victim of arthritis that is becoming progressively more severe. Self help aids are known for the handicapped including utensil holders which clamp over the entire hand, but these devices suffer similar deficiencies.

Insofar as is known, the patent literature is devoid of showing any devices of this type for assisting the handicapped in utilization of utensils and simple tools, except for the Landsberger U.S. Pat. No. 4,389,777 which shows an enlarged handle for an eating utensil, and is therefore the same type of limited solution mentioned above. The training utensil disclosed in the Huck U.S. Pat. No. 3,224,093 is basically a spoon for use in the training of infants, although it is also said to be suitable for use by arthritic patients; as this device depends upon support by the first phalanx of the thumb and resting on the middle finger, it would not for instance be suitable for use by one missing either or both of those appendages.

SUMMARY OF THE INVENTION

It is, accordingly, and object of the invention to overcome deficiencies of the prior art, such as indicated above.

It is another object of the invention to provide for improved ease of use of utensils and simple tools by handicapped persons.

It is still another object of the invention to provide a device for facilitating use by handicapped persons of tools and utensils.

It is yet another object of the invention to provide a generic device capable of accepting a variety of tools for use by handicapped or disabled persons.

It is a further object of the present invention to provide a device which is adjustable to suit different users afflicted by a number of disabilities.

It is still a further object of the present invention to provide a device which is inexpensive to manufacture and will enable a single construction to be used by people with different manual disabilities.

The device of the instant invention includes a wrap-around handle structure of a length suitable for wrapping about the extremity of a limb. The handle is terminated at one end by either a utensil or tool or preferably by a coupling means for the attachment thereto of a selected utensil or tool. The handle is ideally about one-fourth to three-fifths of an inch in diameter, and of a length sufficient for securely wrapping about a hand, wrist or forearm, e.g. about a foot or more in length. It is important that the handle or shaft not be resiliently flexible, i.e. it must not be elastic, but instead after it has been bent to shape, e.g. around a hand, it must remain in its bent configuration.

The above and other objects in the nature and advantages of the instant invention will be more apparent from the following detailed description of various embodiments, taken in conjunction with the drawing, wherein:

DETAILED DESCRIPTION OF EMBODIMENTS

Figure 1:
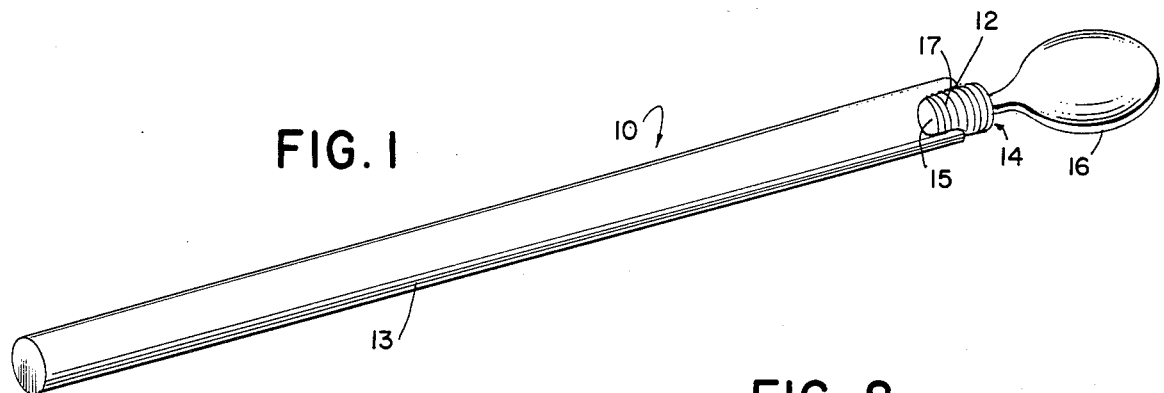
FIG. 1 is a perspective view, partly broken away, of a first embodiment of the instant invention with the shaft or handle in a straightened position, and with a spoon appliance affixed to the end thereon.

In FIG. 1, a prosthetic device 10 according to the instant invention is shown comprising a shaft or handle 13 and a coupling means 14 for joining a suitable utensil or tool to the shaft or handle 13. In this embodiment 10, the coupling means 14 is used to couple the device of the instant invention to a spoon appliance 16. Here the coupling means 14 includes a female member at the end of the shaft 13 comprising an internally threaded region 12, and a complementary male portion 15 for the utensil 16, which male portion 15 is provided with a complementary external threading 17.

The shaft or handle 13 is of a semi-rigid nature, i.e. it can be relatively easily bent and, once bent, will stay in its new configuration until a reasonable amount of force is applied to bend it once again. The amount of forced needed to bend it in a reasonable curve may be, for example, that required to bend a wire coat hanger in the same curve. Put another way, the shaft or handle 13 is ideally about as rigid as three strands of solid cooper wire, no. 12 guage. It must be understood, of course, that depending on the user and the person effecting the bending (who might be a different person) a greater or lesser rigidity may be desirable and suitable. It is important that the shaft or handle 13 not be resiliently flexible, i.e. it must not be elastic, but instead must retain its new shape after being bent.

While the coupling means 14 is disclosed as being of the screw threaded type, it will be understood that other types may also be used, e.g. of a friction type, or a bayonet type, or a spring-loaded bayonet type, or any of a number of connecting means known to those skilled in the art. Also, while the coupling means in FIG. 1 has the male member on the utensil and the female member on the shaft, it will be understood that these may be reversed. Regardless, it is preferred that the coupling means be of the readily detachable type so that it is capable of repeated coupling and uncoupling, with relative ease, so that a single shaft 13 is capable of receiving a variety of utensils and tools, such as spoons, knives, forks, etc.

Figure 2:
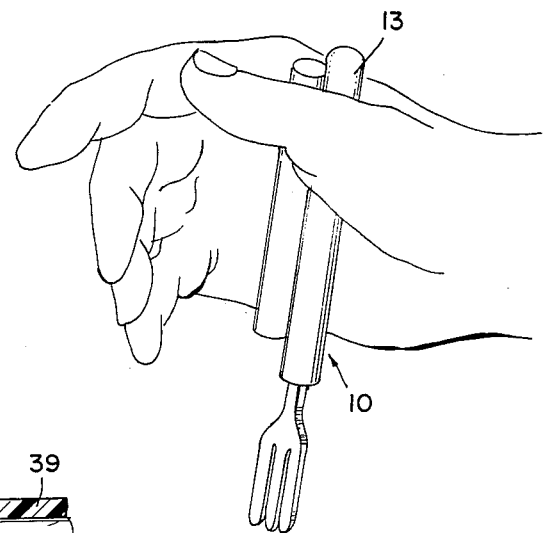
FIG. 2 is a perspective view of a hand with the device of FIG. 1 wrapped thereabout preparatory to use, this time with a fork attached to the end thereof.

In FIG. 2, a hand is shown with the shaft 13 of the device 10 of FIG. 1 wrapped thereabout. If the hand depicted could not close, for example, the device 10 would nevertheless be sufficiently firmly affixed to the hand by the wrapping depicted to allow use of the fork appliance coupled to the shaft 13.

It will be understood that the wrapping about the palm as depicted in FIG. 2 is not the only way that the device 10 can be used. For example, the shaft or handle 13 can be wrapped about the wrist, then coursed down the palm and thence about the little and ring fingers as a whole. Such a wrapping configuration is suitable for a user who has, for instance, lost his or her thumb, index and middle fingers. For the user who has lost an entire hand, the device can be wrapped about the wrist. Other ways of configuring or wrapping the device will be obvious to the user and/or the wrapper once faced with a particular disability and the known capabilities of the device.

Figure 3:
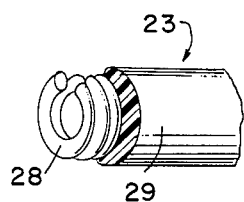
FIG. 3 is partly broken away, partly in section, partial perspective view of another embodiment of a handle or shaft in accordance with the present invention.

FIG. 3 shows another embodiment of a shaft 23 having the same characteristics as the shaft 13. Here the shaft 23 is provided with an internal coiled structure 28 covered with a rubber or plastic hose 29. The coil 28 must not be springy, i.e. must not be elastically deformable, and therefore is formed of metal or plastic which has poor memory, i.e. is plastically deformable so that it does not return to its previous configuration without force being applied thereto.

Figure 4:
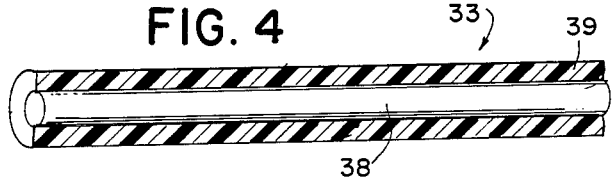
FIG. 4 is a partial sectional perspective view of yet another embodiment of a shaft in accordance with the present invention.

FIG. 4 shows another construction for a shaft or handle 33 according to the invention. As in the embodiment 23 of FIG. 3, the handle 33 is provided internally with a soft rod or wire 38 having non-elastics properties, the wire or rod 38 extending axially rather than being coiled. Covering the rod or wire 38 is a plastic sheathing 39. The embodiment 33 of FIG. 4 has a number of advantages over the embodiment 23 of FIG. 3, and in particular it is simpler and less expensive to manufacture. No coiling of the wire 38 is necessary and the sheathing 39 may be formed by coating from a polyvinyl chloride or the like plastisol, or the sheathing 39 may be simply extruded about the wire 38.

Figure 5:
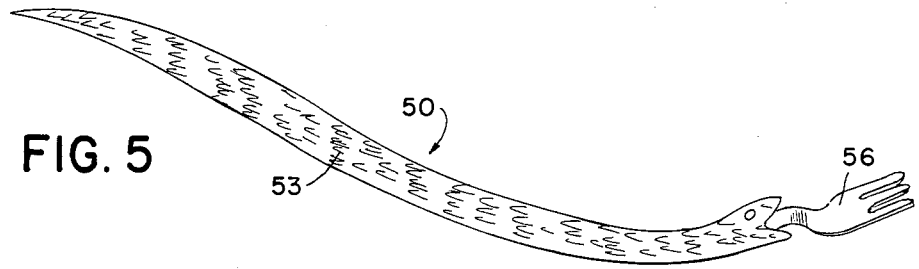
FIG. 5 is a perspective view of another embodiment of the present invention wherein the handle or shaft is configured, such embodiment being designed particularly for use by a handicapped child.

FIG. 5 shows another device 50 in accordance with the present invention again comprising an elongated shaft or handle 53 having a releasably coupled utensil 56 at one end thereof. The shaft 53 of the device 50 is provided with a flexible plastic covering in the form of an animal, e.g. a snake or an eel or the like, and is especially constructed with a child user in mind. Of course, consistent with the other embodiments, the shaft must be semi-rigid and non-elastic so that it can be bent to shape without returning to its original linear form. The shaft 53 may be formed such as by injection molding with a suitable wire or wires therewithin and along the length thereof.

Figure 6A:
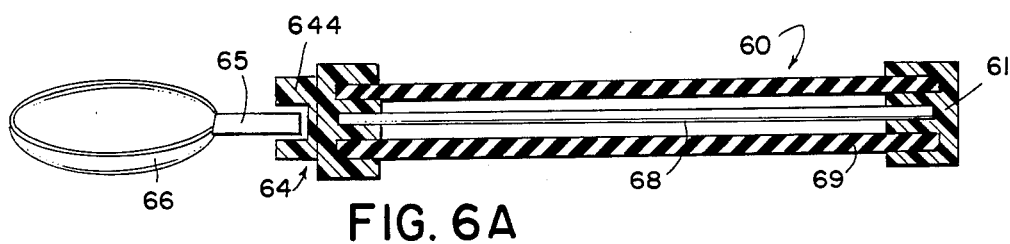
FIG. 6A-6C show in cross-section another embodiment according to the invention and sequential steps in its fabrication.
Figure 6B:
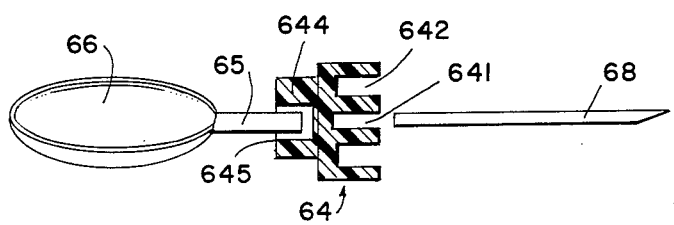
Figure 6C:
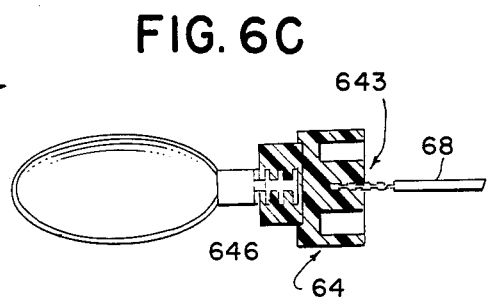

FIG. 6A shows another embodiment 60 according to the instant invention formed of four separate elements including a pair of end caps 61 and 64, a semi-rigid and non-elastic wire 68, and a covering sheet 69. In this case the end caps 61 and 64 may be injection molded of rigid plastic or die cast of metal, the wire 68 may be three-sixteenth inch cooper wire, and the covering 69 may be simply rubber tubing. The end cap 64 as shown in FIG. 6B has an axially extruding cavity 641 for frictionally receiving an end of the wire 68, and an annular cavity 642 for frictionally receiving therewithin an end of the tubing 69 extruded of rubber or vinyl polymer. To better retain the hose 69 in the annular cavity 642, and the end of the cooper wire 68 in the central aperture 641, adhesive may additionally be used. Alternatively, retention may be improved by crimping as at 643 as shown in FIG. 6C. The opposite ends of the tubing 69 and the cooper wire 68 may be affixed within the end cap 61 in the same way.

The end cap 64 is providing with a forward facing extension 644 provided with a forward facing central opening 645. Such central opening 645 in turn receives the shaft 65 of a suitable utensil 66. The coupling of the shaft 65 in the aperture 645 may be releasable as preferred and as described in more detail above, or it may be permanent such as by crimping at location 646 as shown in FIG. 6C.

Figure 7:
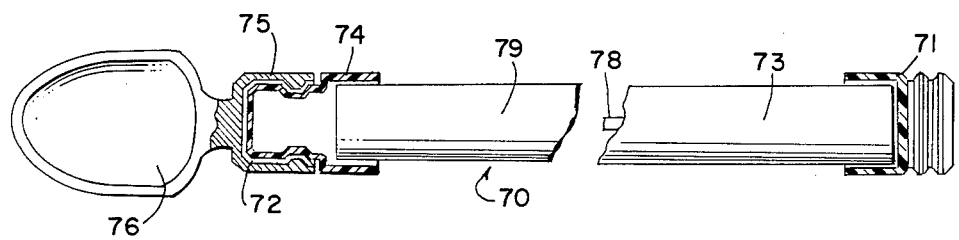
FIG. 7 is a partial cross-sectional view of yet another embodiment according to the present invention.

FIG. 7 shows yet another device 70 according to the invention, including a semi-rigid and non-elastic handle 73 formed of an internally embedded eight gauge wire 78 covered with a one-quarter inch flexible polyvinyl chloride sheathing 79. Also provided is an injection molded rear end cap affixed to the sheathing 79 by adhesive, and an injection molded front end bit cap 74 also connected to the sheathing 79 by adhesive. The front end bit cap 74 is provided with a male coupling means 72. Also provided are suitable replaceable utensil attachments such as the spoon 76 having a female coupling means 75.

It will be understood that a number of variations are possible. Thus, the handle can be injection-molded in one piece of a soft flexible plastic or elastomer with one or more non-elastic wires embedded therein. Another possiblity is to utilize preformed rubber or vinyl hosing, into the interior of which can be inserted one or more wires to provide the desired semi-rigidity and non-elasticity. A third possibilty is to use a woven, braided or knitted cable having the desired degree of semi-rigidity. Other possibilities will be apparent and possible, so long as the semi-rigidity and non-elasticity is consistent with the aforementioned requirements and the length is sufficient so as to wrap about the user's limb.

The foregoing description of the specific embodiments will so fully reveal the general nature of the invention that others can, by applying current knowledge, readily modify and/or adapt for various applications such specific embodiments without departing from the generic concept, and therefore such adaptations and modifications should are intended to be comprehended within the meaning and range of equivalents of the disclosed embodiments. It is to be understood that the phraseology or terminology employed herein is for purposes of description and not of limitation.

What is claimed is:

1. A device for use by the manually disabled for carrying an eating utensil such as a spoon or a fork, comprising:
   means for wrapping about and thereby attaching to the extremity of a manually disabled person, said means comprising an elongated semi-rigid handle element having first and second ends, and of length sufficient for wrapping entirely about a hand at least once, said semi-rigid handle being sufficiently rigid so that once it is bent it will retain its configuration until rebent, said first end being free for said wrapping; and
   coupling means at said second end of said handle for the attachment thereto of said utensil;
   said handle element including a flexible sheathing along substantially its entire length and an internal semi-rigid supporting element which is non-elastic.

2. A device according to claim 1, wherein said handle comprises a cable structure.

3. A device according to claim 1, wherein said handle comprises a tubular shaft having a diameter on the order of about one-half inch.

4. A device according to claim 1, wherein said handle has a length of approximately one foot.

5. A device according to claim 1, wherein said sheathing is molded plastic, and is embossed to provide the configuration of an animal.

6. A device for use by the manually disabled for use with an eating utensil such as a spoon or a fork, comprising:
   means for wrapping about and thereby attaching to the extremity of a manually disabled person, said means comprising an elongated semi-rigid handle element having first and second ends, and of length sufficient for wrapping entirely about a hand at least once, said semi-rigid handle being sufficiently rigid so that once it is bent it will retain its configuration until rebent, said first end being free for said wrapping;
   coupling means at said second end of said handle for the attachment thereto of said utensil; and
   said eating utensil releasably attached to said handle via said coupling means;
   said handle element including a flexible sheathing along substantially its entire length and an internal semi-rigid supporting element which is non-elastic.

7. A device according to claim 6, wherein said coupling means comprises a screw thread.

8. A device according to claim 6, wherein said coupling means comprises a friction interlock.

9. A device for use by the manually disabled for carrying an eating utensil such as a spoon or a fork, comprising:
   means for wrapping about and thereby attaching to the extremity of a manually disabled person, said means comprising an elongated semi-rigid handle element having first and second ends, and of a length sufficient for wrapping entirely about a hand so that a portion thereof overlaps said first end, said semi-rigid handle being of a rigidity so that it can be easily bent manually and so that once it is bent it will retain its configuration until rebent, said first end being free for said wrapping; and
   coupling means at said second end of said handle for the attachment thereto of said utensil;
   said handle element including a flexible sheathing along substantially its entire length and an internal semi-rigid supporting element which is non-elastic.

* * * * *